Patented Aug. 28, 1945

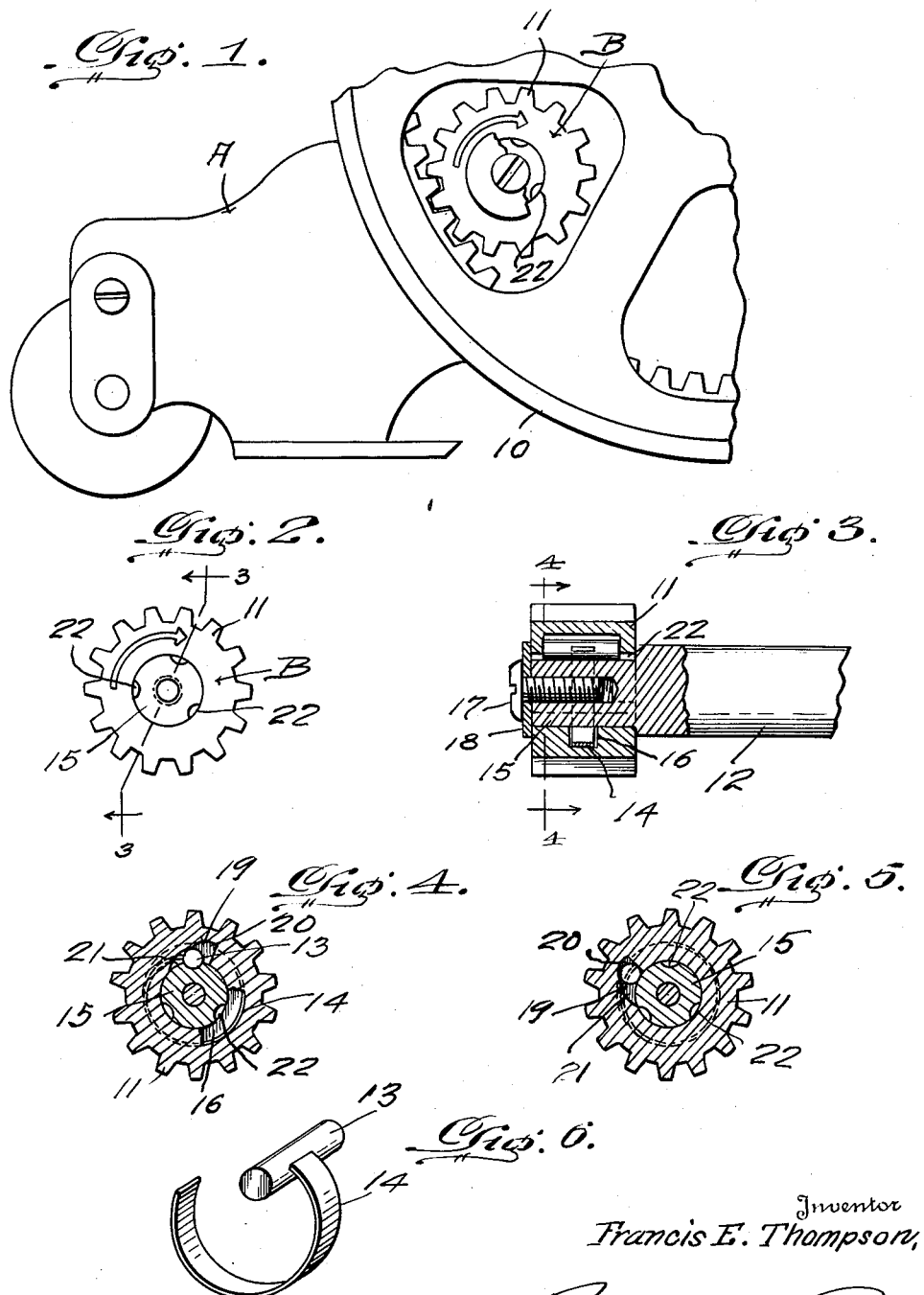

2,383,696

UNITED STATES PATENT OFFICE 2,383,696

LAWN MOWER GEAR AND LOCKING DEVICE

Francis Edward Thompson, Lawrence, Mass.

Application May 23, 1944, Serial No. 536,910

2 Claims. (Cl. 192—46)

The invention relates to a gear clutch, and more especially to a lawn mower gear and locking device.

The primary object of the invention is the provision of a device of this character, wherein the locking of a gear to its operating spindle or shaft can be automatically effected without undue wear thereon through overrun cam clutch action, and through the use of a roller-like locking pin directly connected to a leaf spring, which is counterseated in the gear and tensioned clipped about the said spindle or shaft, so that the pin will be positive in the working thereof, and maintained in a true operative position.

Another object of the invention is the provision of a device of this character, wherein no undue strain is imposed against the leaf spring, as would be against a coiled spring, as is the case with those commonly used in the present day overrun clutches.

A further object of the invention is the provision of a device of this character, wherein the mounting thereof renders its practically dirt and dust proof, permitting convenient lubrication, and is susceptible of quick removal and replacement interchangeably to either end of the spindle or shaft.

A further object of the invention is the provision of a device of this character, wherein the locking pin and spring are unitary, effecting a single placement unit, and eliminates the use of a pivoted or sliding latch for clutch operation.

A still further object of the invention is the provision of a device of this character, which is simple in construction, thoroughly reliable and efficient in operation, strong, durable, positive in the working thereof, readily accessible and easily removed, compact, completely confined or housed, requiring minimum attention, economic in repair cost, and inexpensive to manufacture and install.

With these and other objects in view the invention consists in the features of construction, combination and arrangement of parts, as will be hereinafter more fully described, illustrated in the accompanying drawing, which shows the preferred embodiment of the invention, and pointed out in the claims hereunto appended.

In the accompanying drawing:

Figure 1 is a fragmentary side elevation of a lawn mower showing the device constructed in accordance with the invention in association therewith.

Figure 2 is an end view of the gear spindle or shaft with the gear in elevation thereon and the retaining screw and companion washer removed.

Figure 3 is a sectional view taken on the line 3—3 of Figure 2 looking in the direction of the arrows.

Figure 4 is a sectional view taken on the line 4—4 of Figure 3 looking in the direction of the arrows, with the locking pin in position for locking the gear and spindle or shaft together.

Figure 5 is a view similar to Figure 4 with the locking pin in releasing condition.

Figure 6 is a perspective view of the locking pin and its leaf spring unitary with each other and removed from the gear.

Similar reference characters indicate corresponding parts throughout the several views in the drawing.

Referring to the drawing in detail A designates generally a portion of a lawn mower, which is of a standard construction, having a power wheel, a portion thereof being denoted at 10, while in internal toothed meshing engagement with such wheel is the driven pinion 11, having the locking device, indicated generally at B, as constituting the present invention, for overrun clutch engagement of the pinion with the driving spindle or shaft, only a portion thereof being denoted at 12, for operating the lawn cutter element, not shown, of the mower.

The device B, comprises a roller-like locking pin 13 having fixedly joined thereto medially of its length one end of an open loop-formation leaf spring 14, which formation is best seen in Figure 6 of the drawing, and intersects the transverse center of such pin 13 at the end of the said spring joining therewith, this end just back of the said pin being bent so that the pin protrudes within the loop-formation, when the spring is at normalcy, the inherent resiliency of the spring being effective for clutch seating operation of such pin, as hereinafter described.

The gear pinion 11 internally thereof concentric to the center bore for the reduced end 15 of the spindle or shaft 12 is formed with an annular channel 16 opening into such bore and of a width for the seating of the spring 14 within such channel, the latter being centered in the pinion to intersect the bore midway of its length. The pinion 11 is rotatably journaled on the end 15 of the spindle or shaft 12 and retained thereon by a removable retaining screw 17 and companion washer 18, respectively, the screw being tapped into the end 15, as best seen in Figure 3 of the drawing.

Built into the pinion 11, crosswise of the channel 16 for intersection thereof and communicating with the bore for the reduced end 15 is an escapement notch 19, which is of a length slightly greater than the length of the pin 13 for the loose seating of the latter therein. This notch 19 is formed with a stepped double camming ceiling providing deep and shallow communicating segmental shaped cam areas 20 and 21, respectively, for over-riding or overrunning the pin 13 to force the latter into seating engagement, selectively, in semi-circular shaped locking grooves 22 formed spaced from each other peripherally in the reduced end 15 of the spindle or shaft 12. In this manner a clutching action and unclutching operation is had between the pinion 11 and the said shaft 12, accordingly to the direction of rotation of such pinion, the pin 13 being the locking medium.

The device B functions as an over-run clutch between the pinion 11 and the shaft 12, the action of the pin 13 with its spring 14 being best seen in Figures 4 and 5 of the drawing. The spring 14 serves as a clip about the spindle or shaft 12, and also as an anchor for the pin 13 and the tensioning thereof for its proper operation. In one direction of rotation of the pinion 11 it is automatically locked to the spindle or shaft 12, while in reverse rotation, the said pinion 11 is freed from clutch engagement with the said spindle or shaft.

It should be apparent that the gear forms end walls to the notch 19 to retard end thrust of the pin 13, the latter being at all times in position for registry with the grooves 22 and confined partially within the said notch.

The pin 13 with its spring 14 is an assembly with the pinion 11 on detaching the latter from the spindle or shaft 12, and also convenient for replacement, such pinion 11 and the pin 13 therewith being interchangeable from one end to the other of the spindle or shaft. The assembly is practically dirt and dust proof. In the assembly of the pin 13 and the spring 14 within the pinion 11, the said spring expands and seats itself against the ceiling of the channel 16, which is best seen in Figures 4 and 5 of the drawing. The spring 14 attached to the locking pin 13 is inserted in the hole in the pinion 11 where the said spring 14 will expand and seat itself in the channel 16. The bend in the spring 14 back of the pin 13 will cause the locking pin to hang into the shaft hole in the pinion 11. In Figure 5 of the drawing the locking pin 13 has been pushed up into the area 20 where it rests on the surface of the shaft 12, for freeing the pinion 11. In Figure 4 of the drawing, the pin 13 has become locked in a groove 22 for the locking of the pinion on the shaft.

The shallow area 21 of the notch 19 wedge locks the pin 13 in clutching position, while the deep area 20 permits escapement activity or unclutching operation of this pin.

What is claimed is:

1. A device for a gear and a shaft rotatably supporting the same, comprising a roller like locking pin interposed between the gear and shaft, a loop-like spring about the shaft and carrying the pin for imparting tension thereon, and a stepped cam on the gear for action on the pin to lock and unlock the gear and shaft to and from each other on clockwise or counterclockwise movements thereof.

2. A device for a gear and a shaft rotatably supporting the same, comprising a roller-like locking pin interposed between the gear and shaft, a loop-like spring about the shaft and bodily carrying the pin for tensioning action thereon, the gear being formed with a channel loosely receiving the spring, the shaft being formed with pin seats concentrically thereof, and a stepped cam on the gear for urging the pin into locking engagement in one of the seats and also for permitting escapement of such pin from the same on determined directions of rotation of either the gear or shaft.

FRANCIS EDWARD THOMPSON.